Feb. 7, 1961     R. C. MIERENDORF ET AL     2,971,151

METAL DETECTORS

Filed Feb. 14, 1958

INVENTOR.
ROBERT C. MIERENDORF
CHARLES F. MEYER
BY
*William H. Schmeling*

United States Patent Office 2,971,151
Patented Feb. 7, 1961

2,971,151

METAL DETECTORS

Robert C. Mierendorf and Charles F. Meyer, Wauwatosa, Wis., assignors to Square D Company, Detroit, Mich., a corporation of Michigan Filed Feb. 14, 1958, Ser. No. 715,450

8 Claims. (Cl. 324—41)

This invention relates to metal detectors and is more particularly concerned with certain improvements and simplifications in the structure disclosed in application Serial No. 609,683, filed September 13, 1956, now Patent No. 2,915,699, of which this application is a continuation in part.

While the detector shown in the application supra has proved to be satisfactory in operation, the present invention is directed to improvements in the device which will increase the reliability of the device and provide a more accessible external adjustment to vary the sensitivity of the device to external disturbances.

The application cited above describes the metal detector as including a pair of driving coils which are energized by an alternating current. The coils are arranged to induce voltages in a pickup coil which are not normally 180° out of phase but shifted slightly from direct phase opposition by an angle $\theta$. The voltages thus induced in the pickup coil are used as a resultant signal which signal is dependent on the angle $\theta$ and the differences in amplitude of the induced voltages. Further, when an object having ferromagnetic properties is introduced into the field of one of the driving coils, a decrease in reluctance occurs between that driving coil and the pickup coil resulting in an increase in voltage of amplitude induced in the pickup coil by that driving coil. This change in amplitude will cause a phase change in the resultant of the vector sum of the two voltages induced in the pickup coil by both driving coils to provide a phase change in the output signal of the pickup coil, which signal may be then amplified if desired before it is impressed on a phase shift detector which has an output circuit arranged to establish a control function in response to the ferromagnetic metal which was originally moved into proximity with the detector.

In the device according to the present invention, at least two adjustments are provided to permit the detector to be tuned to provide the desired response to magnetic metals which are moved into the vicinity of the detector.

It is an object therefore of the present invention to establish two adjustments in a metal detector, one of which is used to primarily vary the phase relationships between two induced opposing voltages in a pickup coil and the other of which is used to vary the amplitude of one of the induced voltages.

A further object of the present invention is to support a sensitivity adjustment of a metal detector in the moldable plastic material which forms the potting for the coil assembly of the detector.

Another object of the present invention is to position a means which is used primarily to adjust the amplitude of the voltage induced in the pickup coil by the compound which is used to pot the coil assembly of the detector.

A still further object of the present invention is to provide a sensitivity adjustment for a metal detector which adjustment comprises a nonmagnetic nut and a magnetic screw threadedly received in the nut which nut is positioned by the potting of the detector.

Further objects and features of the invention will be readily apparent to those skilled in the art from the specification and appended drawing illustrating certain preferred embodiments in which.

Figure 1:
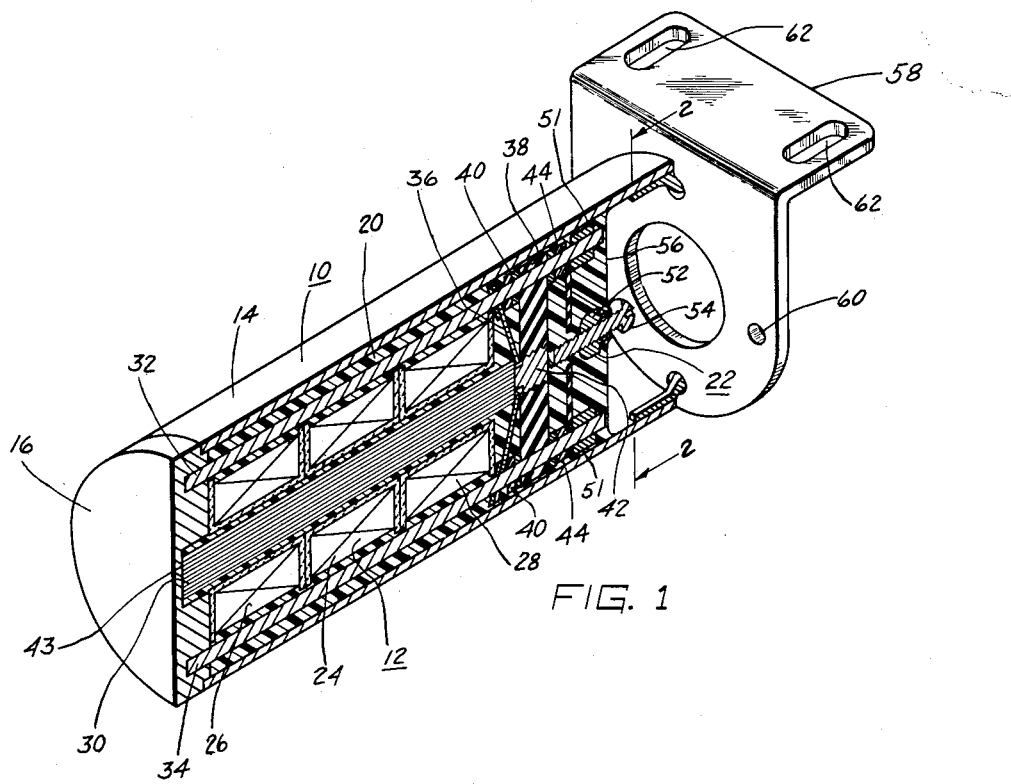
Fig. 1 is a perspective view partly in section of the detector according to the present invention.

In the drawings, the numeral 10 designates a metal detector according to the present invention. The detector 10 includes a coil assembly 12, a sleeve 14, a cover 16 having an uninterrupted exposed surface, a potentiometer 18, a molded plastic material which forms a potting 20 for the coil assembly in the sleeve 14 and a means 22 which is embedded in the potting material 20 and is used to adjust the amplitude of the voltages in the coil assembly.

The coil assembly 12 includes a pickup coil 24 surrounding the central portion of a ferromagnetic rod which forms the core 30 for the coil assembly. Positioned on opposite sides of the pickup coil 24 are a pair of driving coils 26 and 28 which surround the core 30. The coils 26 and 28 are arranged adjacent the respective ends of the core 30 to induce substantially equal and opposite voltages in the pickup coil. These coils are preferably electrically connected in series and in circuit with the potentiometer 18 which is adjusted so the voltages induced in the pickup coil thereby will be slightly displaced in phase by an angle $\theta$.

The coil assembly 12 is held in position on the cover 16 by a means which includes the threaded rods 32 and 34, a leaf spring member 36, and nuts 40.

Figure 3:
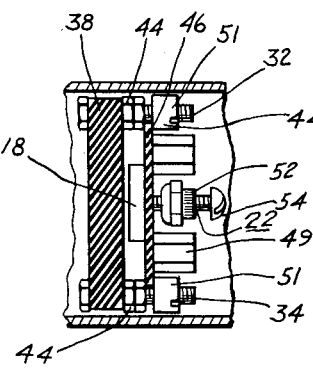
Fig. 3 is a cross sectional view taken along line 3—3 in Fig. 2, showing a broken away portion of the detector in Fig. 1.
Figure 2:
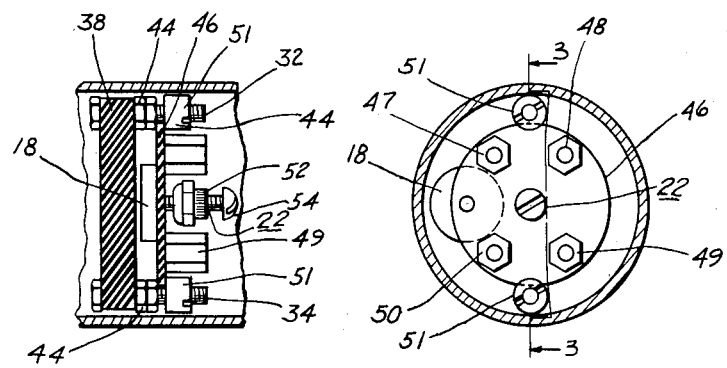
Fig. 2 is an end view of the device in Fig. 1, taken along line 2—2 in the direction indicated by the arrows prior to the inclusion of the potting material.

When the parts of the device are assembled, the coil assembly including the core and the coils 24, 26 and 28 are positioned with the end of the core in a recess 43 in the cover 16 as shown. The coil assembly of course has coil leads, not shown, extending therefrom and is maintained in position relative to the cover by means of the threaded rods 32 and 34 which have one end threaded into the cover 16 and the other end arranged to receive openings in the spring member 36. The spring member 36 is biased tightly against the top surface of core 28 by means of nuts 40. After the parts are thus assembled, the insulating block 38, which has suitably located openings therein to receive the rods 32 and 34, is positioned on the assembly. The insulating block 38 is provided with a threaded opening which threadedly receives a screw 42. The insulating block is held in position by the nuts 44 as shown. An insulating disc 46 is also part of the detector 10 assembly. The disc 46 has terminals 47—50 and the potentiometer 18 positioned thereon and is secured to the leads from the coils 24, 26 and 28, as described in the application supra. After the parts are thus assembled, the entire assembly is positioned within the sleeve 14 and the insulated disc 46 is held in position as shown in Fig. 3 by the nuts 51 which are threaded to rods 32 and 34. The entire assembly is partly filled with a suitable moldable thermoplastic material to a level to embed block 38. The moldable plastic compound which may be used for filling the enclosure formed by the cover 16 and the sleeve 14 to provide a potting 20 for the coil assembly 12 within the enclosure are well known to those skilled in the art and may consist of a suitable epoxy resin compound.

After the detector 10 is thus partially potted, the adjustment means 22 comprising the nut 52 which is of nonmagnetic material and the screw 54, formed of magnetic material, is positioned as shown and an additional amount of the molding material is deposited within the casing to fill the enclosure to the level 56. Prior to the final filling of the enclosure, the screw 54 is coated with a suitable material which will prevent adherence of the molding material to the screw. The materials used to accomplish this result are also well known to those skilled in the molding art.

Prior to the final filling operation however, the potentiometer 18 and screw 42 are factory adjusted to provide a predetermined phase angle $\theta$ and amplitude respectively between the opposing voltages induced in pickup coil 24. The final filling, of course, will completely embed the potentiometer 18 and the screw 42 so this adjustment cannot be later varied when the detector 10 is placed in service. After the assembly of the detector has been completed, the sensitivity of the detector 10 to magnetic articles passed in the vicinity of cover 16 may be varied by adjusting the distance between the end of the screw 54 and the core 30. For example: it has been found that the sensitivity of the detector 10 can be changed from being responsive to an object one inch removed from the cover 16 when the screw 54 is fully removed from the embedded nonmagnetic nut 52, to ⅝" when the screw is fully threaded into the nut. The screw operates to vary the amplitude of the voltage induced in coil 24 by the coil 28 to vary the sensitivity of the device relative to magnetic materials which are placed in the vicinity of its detecting end 16.

The mounting means as shown in Fig. 1 includes an L-shaped element 58 which is suitably attached to the end of the sleeve 14. The element 58 has openings 60 to permit the securement to be accomplished by means of studs secured to the sleeve 14 and openings 62 to permit the detector 10 to be adjustably mounted on a support. In this connection it is to be noted that the element 58 can be reversed from the position shown so the portion which includes the openings 62 overlays the sleeve 14. This arrangement will increase the flexibility of mounting for the metal detector 10.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a detector of the character described, the combination comprising; a coil assembly including a ferromagnetic rod forming a core for the detector, a pickup coil centrally located on the core, a driving coil adjacent each end of the core, a sleeve surrounding the coil assembly, said sleeve having openings on the respective ends thereof, a nonmagnetic member closing one end of the sleeve, a moldable plastic material forming a potting for the assembly in the sleeve and means supported solely by the material adjacent the other open end of the sleeve and spaced from the core for adjustably varying the inductive coupling between the driving coil and the pickup coil from the other open end of the sleeve.

2. In a detector of the character described, the combination comprising; a coil assembly including; a ferromagnetic rod forming a core for the detector, a pickup coil centrally located on the core, and a pair of driving coils surrounding the rod and disposed adjacent the opposite ends of the core, a sleeve surrounding the coil assembly having an open end and a nonmagnetic cover closing the other end of the sleeve, a moldable material forming a potting for the coil assembly in the sleeve, and a means supported solely by the potting adjacent the core and open end for adjusting the mutual inductance between the driving coil adjacent the open end pickup coil from the open end of the sleeve.

3. The combination as set forth in claim 2 wherein the means comprise a nonmagnetic nut and a magnetic screw adjustably threaded into the nut.

4. In a metal detector of the character described, the combination comprising; a coil assembly including; a ferromagnetic rod forming a core for the assembly, a pickup coil centrally located on the rod, and a driving coil disposed adjacent each end of the rod, an enclosure for the coil assembly comprising a sleeve of magnetic material surrounding the assembly and having an open end and a cover of nonmagnetic material closing the other end of the sleeve, a filling of moldable plastic material forming a potting for the coil assembly in the enclosure, and means supported solely by the plastic material and positioned adjacent the open end of the sleeve to be accessible from the open end for adjusting the sensitivity of the detector to metal.

5. The combination as set forth in claim 4 wherein the driving coils are connected in series and a potentiometer is included in the detector is arranged to vary the relative current flow in the coils.

6. In a metal detector of the character described, the combination comprising; a coil assembly including; a ferromagentic rod forming a core for the detector, a pickup coil surrounding and centrally disposed on the core and a pair of driving coils surrounding the core and disposed on opposite sides of the pickup coil, an enclosure for the coil assembly comprising; a sleeve having an open end and an end closed by a cover of nonmagnetic material, and a moldable plastic material filling the enclosure and providing a potting for the coil assembly and a means supported solely by the plastic material and accessible from the open end of the sleeve for adjusting the sensitivity of the detector to metal objects when the objects are moved in the vicinity of the cover.

7. In a metal detector of the character described, the combination comprising; a coil assembly including; a ferromagnetic rod forming a core for the detector, a pickup coil surrounding and centrally disposed on the core, a pair of driving coils surrounding the core and disposed on opposite sides of the pickup coil, said driving coils being electrically connected in series and arranged for inducing an E.M.F. in the pickup coil, a resistance in circuit with at least one of the driving coils for displacing the phase angle of the E.M.F.'s induced in the pickup coil by the respective driving coils, an enclosure for the coil assembly comprising; a sleeve having an open end and an end closed by a cover of nonmagnetic material, and a moldable plastic material filling the enclosure and providing a potting for the coil assembly in the enclosure, and a means supported solely by the plastic material and accessible from the open end of the sleeve for varying the E.M.F. induced by one of the driving coils and thereby varying the sensitivity of the detector.

8. The combination as set forth in claim 7 wherein the means includes a nonmagnetic nut embedded in the plastic material and a magnetic screw threadedly received in the nut.

References Cited in the file of this patent

UNITED STATES PATENTS

| | | |
|---|---|---|
| 2,104,643 | Greenslade | Jan. 4, 1938 |
| 2,321,356 | Berman | June 8, 1943 |
| 2,489,920 | Michel | Nov. 29, 1949 |
| 2,598,252 | Gossick | May 27, 1952 |
| 2,738,466 | Niederman | Mar. 13, 1956 |